(12) United States Patent
Jones et al.

(10) Patent No.: US 9,180,509 B2
(45) Date of Patent: Nov. 10, 2015

(54) COLD WORKING HOLES IN A COMPOSITE AND METAL STACK

(71) Applicant: The Boeing Company, Chicago, IL (US)

(72) Inventors: Michael D. Jones, San Antonio, TX (US); Nathan Andrew Allen, San Antonio, TX (US); Julie A. Ton-That, Houston, TX (US); Anthony B. Lawrence, Sahuarita, AZ (US)

(73) Assignee: THE BOEING COMPANY, Chicago, IL (US)

( * ) Notice: Subject to any disclaimer, the term of this patent is extended or adjusted under 35 U.S.C. 154(b) by 99 days.

(21) Appl. No.: 14/062,507

(22) Filed: Oct. 24, 2013

(65) Prior Publication Data

US 2015/0114071 A1 Apr. 30, 2015

(51) Int. Cl.
*C21D 7/12* (2006.01)
*B21D 31/04* (2006.01)
*B23P 9/02* (2006.01)
*F16B 5/01* (2006.01)

(52) U.S. Cl.
CPC ............... *B21D 31/04* (2013.01); *B23P 9/025* (2013.01); *C21D 7/12* (2013.01); *F16B 5/01* (2013.01); *Y10T 29/49938* (2015.01)

(58) Field of Classification Search
CPC .......... B23P 9/02; B23P 9/025; B23P 11/005; B23P 2700/01; B23P 2700/02; C21D 7/12; B21K 25/00; B29C 65/653; B29C 65/64; Y10T 29/53996; Y10T 29/49863; Y10T 29/4987; Y10T 29/49938; B21C 3/16; B21C 37/154; B21D 53/845

USPC .............. 72/363, 370.06, 370.07, 391.2, 392, 72/391.4, 393; 29/522.1, 523, 524, 524.1, 29/243.518, 243.519, 525, 527.2

See application file for complete search history.

(56) References Cited

U.S. PATENT DOCUMENTS

| | | | |
|---|---|---|---|
| 3,566,662 A | 3/1971 | Champoux | |
| 3,892,121 A | 7/1975 | Champoux et al. | |
| 4,187,708 A | 2/1980 | Champoux | |
| 4,471,643 A | 9/1984 | Champoux et al. | |
| 4,715,203 A | 12/1987 | Wiegenstein | |
| 4,763,399 A | 8/1988 | Roe | |
| 4,819,315 A * | 4/1989 | Cartry et al. | 29/890.031 |
| 5,127,254 A | 7/1992 | Copple et al. | |
| 5,341,559 A * | 8/1994 | Reid et al. | 29/523 |
| 5,437,310 A * | 8/1995 | Cunningham | 138/89 |
| 6,691,789 B2 * | 2/2004 | Jackson et al. | 166/384 |

(Continued)

FOREIGN PATENT DOCUMENTS

| | | |
|---|---|---|
| DE | 102007055378 A1 | 5/2009 |
| EP | 2145750 A1 | 1/2010 |
| FR | 2915913 A1 | 11/2008 |
| FR | 2929352 A1 | 10/2009 |

OTHER PUBLICATIONS

Extended European Search Report, dated Mar. 11, 2015, regarding Application No. EP14190095.1, 8 pages.

*Primary Examiner* — A. Dexter Tugbang
*Assistant Examiner* — Joshua D Anderson
(74) *Attorney, Agent, or Firm* — Yee & Associates, P.C.

(57) ABSTRACT

A hole in a metal and composite stack is cold worked. An interference is formed between a cold working tool and the metal layers results in a radial force that is applied only to the metal layers.

11 Claims, 10 Drawing Sheets

(56) References Cited

U.S. PATENT DOCUMENTS

| | | |
|---|---|---|
| 7,024,908 B2 | 4/2006 | Poast et al. |
| 2008/0005887 A1 | 1/2008 | Glenn et al. |
| 2010/0287776 A1* | 11/2010 | Dantou et al. .............. 29/897.2 |
| 2011/0119891 A1* | 5/2011 | Bianco et al. .................. 29/428 |

* cited by examiner

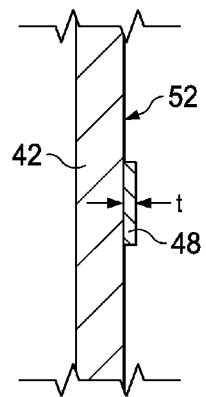
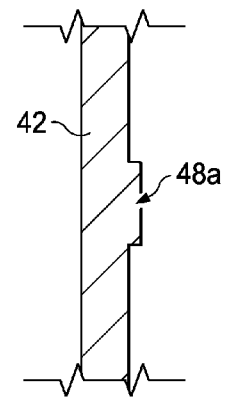
FIG. 8A  FIG. 8B
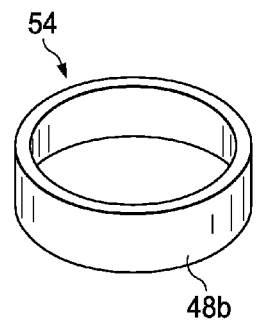
FIG. 9
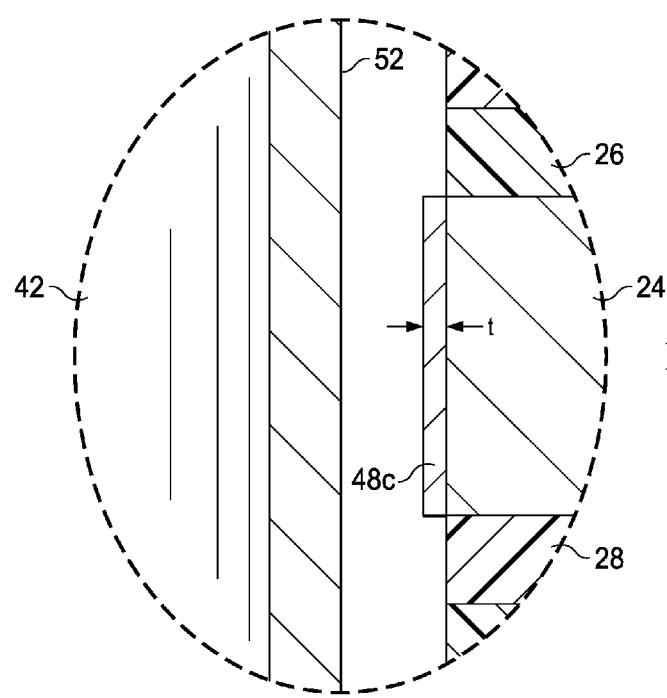
FIG. 10

COLD WORKING HOLES IN A COMPOSITE AND METAL STACK

BACKGROUND INFORMATION

1. Field

The present disclosure generally relates to cold working of holes in metal, and deals more particularly with a method and tool for cold working holes in a stack of metal and composite layers.

2. Background

It is sometimes necessary to form fastened joints between composite and metal members. For example, in the aircraft industry, metal splice elements may be used to join together sections of a composite fuselage frame. Similarly, metal shear ties may be fastened to composite outer skins.

Potential metal fatigue around holes in fastened metal structures can be reduced by "cold working" the holes. One method of cold working involves placing a split sleeve in the hole, and drawing a mandrel through the sleeve. The use of a split sleeve allows for one-sided processing and shields the hole from frictional forces generated by the high interference of the mandrel. Drawing the mandrel through the sleeve expands and causes a radial plastic flow of material in the metal structure surrounding the hole, placing the material in tension. After the mandrel is removed, an annular zone of residual compressive stresses is present in the structure surrounding the hole that may extend up to one diameter beyond the edge of the hole.

Problems are presented however, when cold working a hole formed in a stack of metal and composite layers. Expansion of the split sleeve during the cold working process may result in undesirable deformation of the composite layers surrounding the hole, and/or produce composite residue that builds up on the split sleeve. One solution to this problem involves disassembling the stack, cold working the holes in the metal layers, and then reassembling the layers into the stack. This solution, however, is time-consuming, labor intensive and may not be practical in some applications.

Accordingly, there is a need for a method and tool for cold working holes in a composite and metal stack without disassembling the stack and which may be performed from one side of the stack.

SUMMARY

The disclosed embodiments provide a method and a device for cold working a hole in a stack of composite and metal layers in a fastened joint. The method may eliminate the need for disassembly of the stack to perform cold working of holes in the metal layers. The method reduces or eliminates undesired deformation of the composite layers during the cold working process, and may also reduce or eliminate composite debris and buildup of such debris on cold working tools. The disclosed cold working method may be performed from one side of the stack.

According to one disclosed embodiment, a method is provided for cold working a hole through a stack of at least one metal layer and at least one composite layer. A tool is placed in the hole, and an interference is formed only between the tool and the metal layer. The tool is used to apply an outwardly directed radial force to only the metal layer. The tool applies the outwardly directed radial force by radially expanding into contact with the metal layer while maintaining a gap between the tool and the composite layer. The interference may be achieved by interposing material between the tool and the metal layer, or by removing material from the composite layer around the hole to form a projecting band of metal between the composite layer and the tool.

According to another disclosed embodiment, a method is provided of cold working a hole through a stack of composite and metal layers. A split sleeve is placed into the hole, and then expanded into contact with only the metal layers while maintaining a gap between the composite layers and the split sleeve. A compression force is applied to only the metal layers through the split sleeve. The split sleeve is expanded by drawing a mandrel through the split sleeve. The gap is maintained between the composite layers and the split sleeve by interposing material between the split sleeve and each of the metal layers. The gap may also be maintained by interposing material between the split sleeve and each of the metal layers. Interposing the material may be performed by adding material to the metal layers surrounding the hole or by adding material to the split sleeve.

According to a further disclosed embodiment, a tool is provided for cold working a hole in a composite and metal layer stack. The tool includes an expandable tool member capable of being inserted into the hole and having a band of increased diameter extending around the tool member circumferentially. The band of increased diameter is adapted to contact and apply a compressive force only to a metal layers in the stack. The expandable tool member may be one of a split sleeve, and a mandrel.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

FIG. 8A is an illustration of a cross-sectional taken along the line 8A-8A in FIG. 8

FIG. 8B is an illustration similar to FIG. 8A but showing an alternate form of the band integrated with the split sleeve.

FIG. 9 is an illustration of an isometric view of a bushing that may be placed around the split sleeve.

FIG. 10 is an illustration similar to FIG. 6, but showing the spacer member as a band of material applied to the area of the metal layer surrounding the hole.

DETAILED DESCRIPTION

Figure 1:
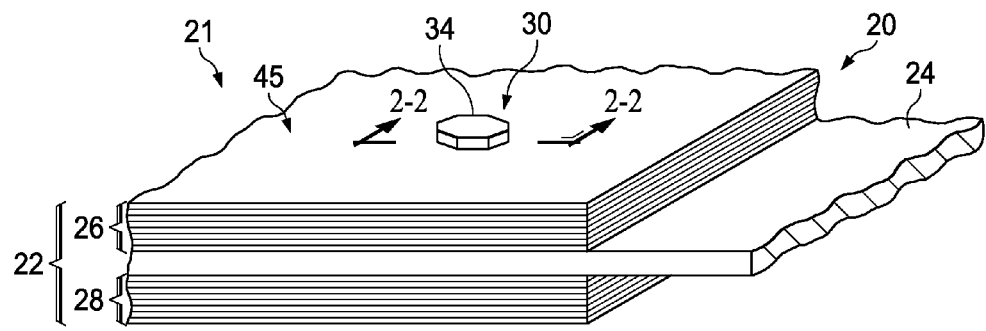
FIG. 1 is an illustration of a perspective view of a fastened joint in a composite and metal stack.
Figure 2:
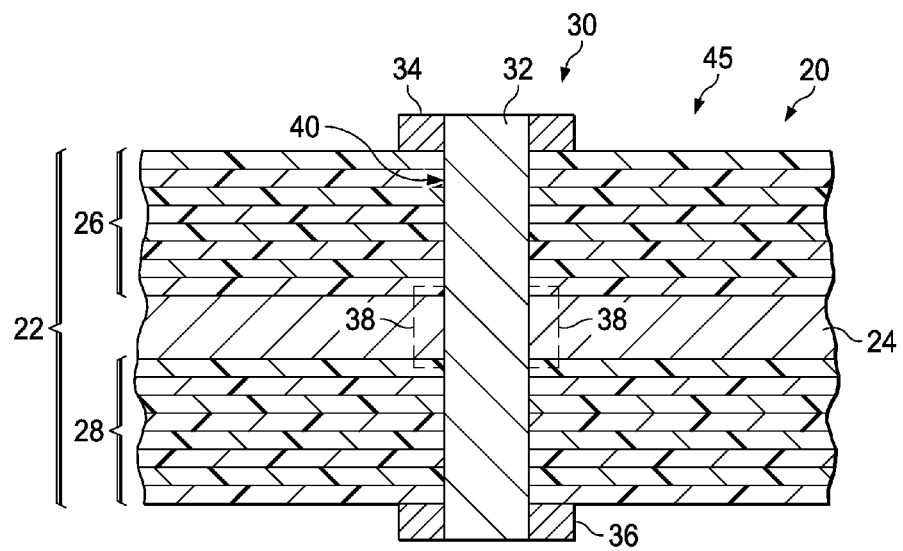
FIG. 2 is an illustration of a cross-sectional view taken along the line 2-2 in FIG. 1.

Referring to FIGS. 1 and 2, a structure 21 contains a composite and metal stack 22 with a fastened joint 20. The stack 22, sometimes also referred to herein as a composite and metal stack 22, may comprise a single metal layer 24 sandwiched between two composite layers 26, 28, however the stack 22 may comprise any number or combination of composite layers 26, 28 and metal layers 24, including, in its simplest form, a single metal layer 24 and a single composite layer 26. The layers 24, 26, 28 in the illustrated joint 20 are fastened together by one or more fasteners 30 that pass through a corresponding hole 40 through layers 24, 26, 28. In the exemplar, the fastener 30 comprises a bolt having a shank 32, a head 34 and a retainer such as a nut 36, however the fastener 30 may be any of various other fastener forms that are suitable for the application, such as for example and without limitation, a countersunk rivet.

In accordance with the disclosed embodiments discussed below, the hole 40 is cold worked in order to impart residual compressive stresses within a region 38 (FIG. 2) of the metal layer 24 surrounding the hole 40. These residual stresses provide the metal layer 24 with resistance to fatigue, and tend to arrest in any small cracks that may form over time in the metal layer 24 around the hole 40.

As will be discussed below in more detail, the cold working method may be performed entirely from one side 45 of the stack 22, after the stack 22 has been assembled. The disclosed cold working method is carried out by applying a force only to the metal layer 24, while substantially avoiding any direct application of force to the composite layers 26, 28 which might deform or have other undesirable effects on the composite layers 26, 28.

Figure 3:
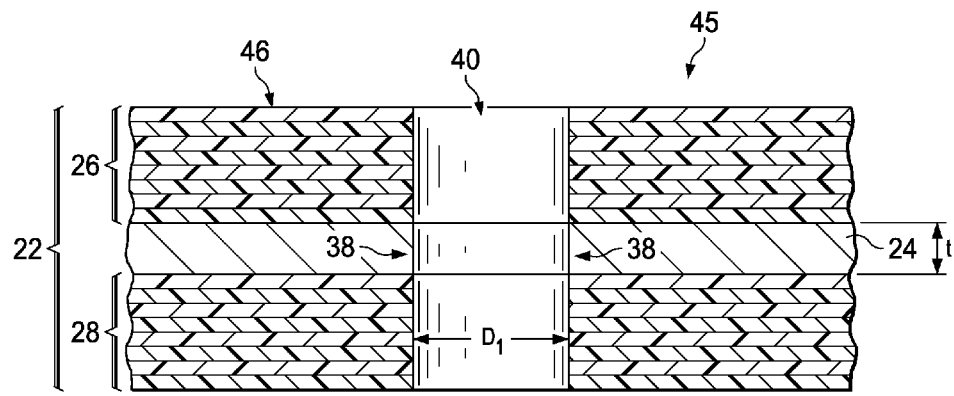
FIG. 3 is an illustration of a cross-sectional view of a composite and metal stack having a hole formed therethrough.
Figure 4:
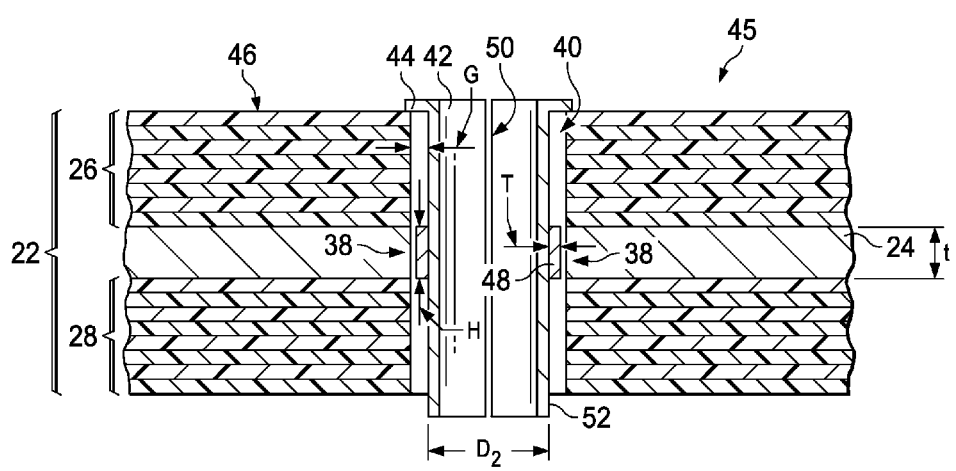
FIG. 4 is an illustration similar to FIG. 3, but showing a split sleeve having been installed in the hole.

Referring now to FIGS. 3 and 4, in order to cold work the hole 40, an expandable tool which may comprise, without limitation, a split sleeve 42, is inserted into the hole 40, from one side 45 of the stack 22. The split sleeve 42 includes a generally cylindrical wall 52 provided with a longitudinal slit 50 therein, and a circumferential shoulder 44 that seats the split sleeve 42 on the surface 46 surrounding the hole 40. The split sleeve 42 is hollow and has an outside diameter $D_2$ that is normally nominally less than the inside diameter $D_1$ of the hole 40.

The split sleeve 42 may be formed from any suitable material that is substantially rigid and incompressible, but which is yieldable to allow the split sleeve 42 to expand. As will be discussed below, cold working of the region 38 metal layer 24 surrounding the hole 40 is achieved by creating an interference between the split sleeve 42 and only the metal layer 24.

In one embodiment, the desired interference between the split sleeve 42 and the metal layer 24 may be achieved by interposing material such as a band-shaped spacer member 48 between the split sleeve 42 and the metal layer 24. The spacer member 48 may extend around substantially the entire circumference of the split sleeve 42. The spacer member 48 may have a height H that is substantially equal to the thickness t of the metal layer 24. The spacer member 48 has a thickness T that will depend on the application, but which is sufficient to maintain a gap G between the outside diameter $D_2$ of the split sleeve 42 and the composite layers 26, 28 when the split sleeve 42 has been expanded.

In the embodiment illustrated in FIG. 4, the spacer member 48 is formed on or may be attached to the outside diameter $D_2$ of the split sleeve 42, however as will be discussed below, other techniques may be used to create the desired gap G between the split sleeve 42 and the composite layers 26, 28.

Figure 5:
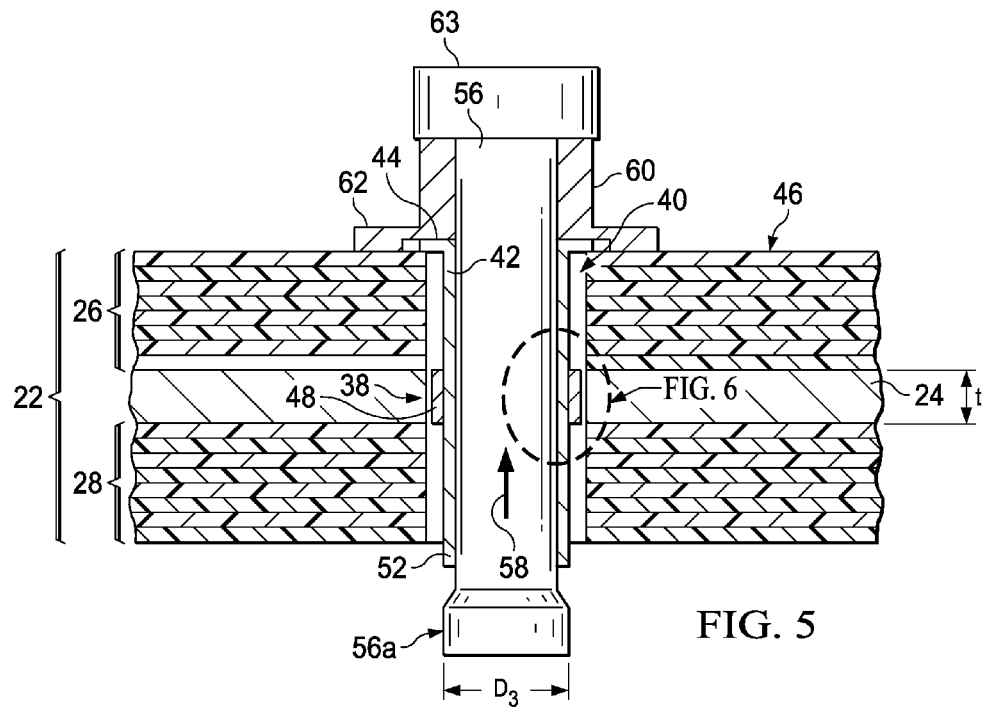
FIG. 5 is an illustration similar to FIG. 4, but showing a mandrel assembly having been installed in the split sleeve.
Figure 6:
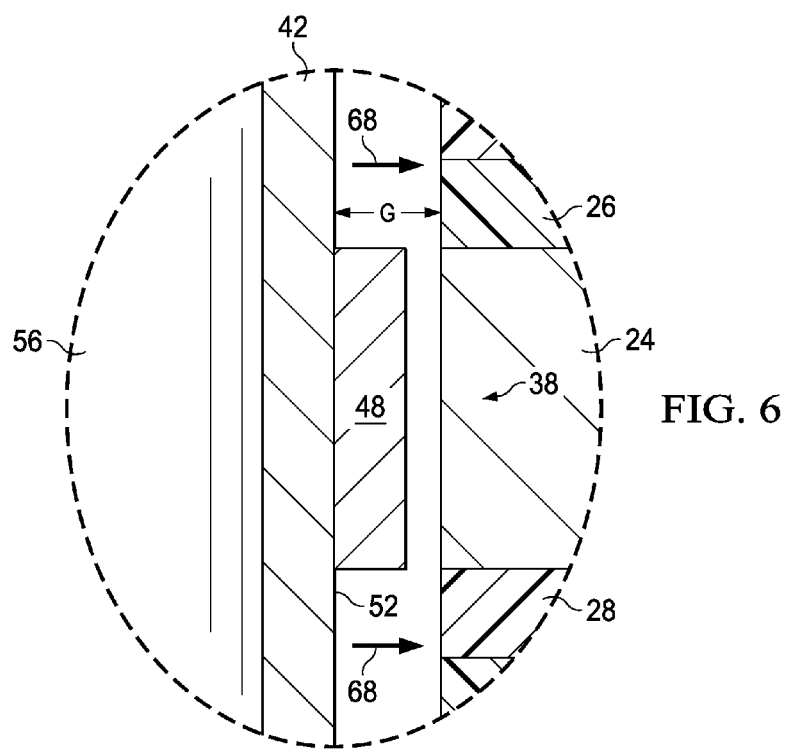
FIG. 6 is an illustration of the area designated as FIG. 6 in FIG. 5.

Referring now to FIGS. 5 and 6, a mandrel 56 is slidably received within the split sleeve 42 and passes through a head 60 having an annular lip 62 that is seated on the surface of the stack 22. A suitable puller on the head 60 is coupled with the mandrel 56. The puller 63 may comprise any suitable device such as a pneumatic cylinder or the like, which pulls 58 the mandrel 56 upwardly through the split sleeve 42. In other embodiments, the mandrel 56 may be pushed, rather then pulled through the split sleeve 42. The mandrel 56 includes an enlarged head portion 56a having an outside diameter $D_3$ that is greater than the inside diameter of the split sleeve 42.

Figure 7:
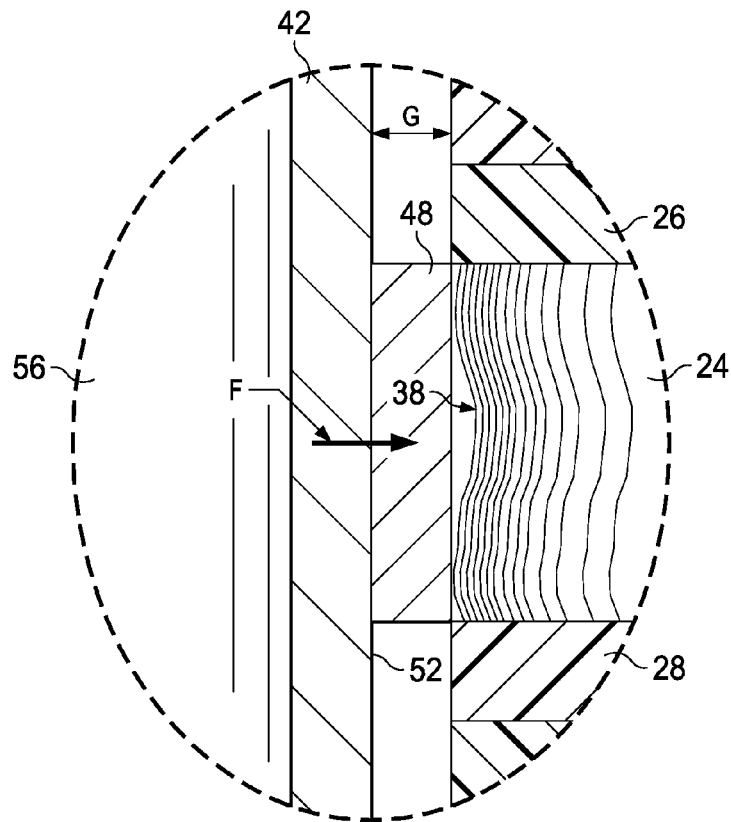
FIG. 7 is an illustration similar to FIG. 6, but showing the split sleeve having been expanded to cold work an area of the metal layer surrounding the hole.

When the mandrel 56 is pulled 58 through the split sleeve 42, the head portion 56a forces the split sleeve 42 to expand 68 (FIG. 6) radially. As shown in FIG. 7, the radial expansion of the split sleeve 42 forces the spacer member 48 into contact with the metal layer 24. The spacer member 48 transmits and applies an outwardly directed radial force F on the metal layer 24 around the hole 40. The radial force F causes the material in the region 38 of the metal layer 24 to yield and be placed in tension. When the split sleeve 42 is removed from the hole 40 the metal material in region 38 shifts from tension into compression.

It should be noted here that the combination of the split sleeve 42 and internal mandrel 56 is merely illustrative of a wide range of tools that may be used to practice the disclosed method. For example, and without limitation, the desired interference with only the metal layer 24 may be achieved using an expandable mandrel (not shown), and a spacer member 48 placed between the metal layer 24 and the expandable mandrel.

Figure 8:
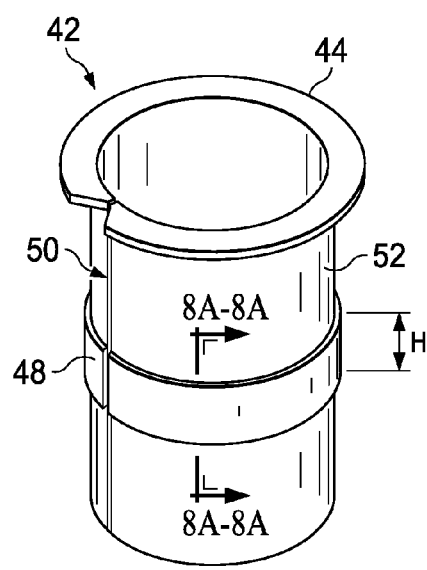
FIG. 8 is an illustration of a perspective view of a split sleeve having an applied band of material thereon.

FIGS. 8 and 8A illustrate one form of the split sleeve 42, similar to that shown in FIGS. 4-7 discussed above. In this example, a band-like spacer member 48 having a height H and a thickness t extends around the circumference of the split sleeve 42. The spacer member 48 may comprise a suitable incompressible material that may be formed on or attached to the wall 52 using any of various techniques. For example, the spacer member 48 may be formed directly on the wall 52 by electroplating, flame spraying, laser sintering or micro-welding material onto the wall 52. In another embodiment, shown in FIG. 8B, a spacer member 48a may be formed integral with the split sleeve 42 by removing material from the split sleeve 42 using etching, machining or other material removal processes.

Referring to FIG. 9, in another embodiment, the desired interference between the split sleeve 42 and the material layer 24 may be achieved using a spacer member 48b comprising a bushing 54 may be slid over the split sleeve 42 and fixed in place at a desired longitudinal position on the wall 52, aligned with the metal layer 24.

FIG. 10 illustrates still another technique for achieving the desired interference for contacting and cold working only the metal layer 24. In this embodiment, a spacer member 48c comprises a layer of material having a thickness t that is formed directly on the area of the metal layer 24 that surrounds the hole 40. The material forming the spacer member 48c may be applied to the metal layer 24 using electroplating, micro-welding, flame spraying, laser sintering or other suitable additive processes. The spacer member 48c may be removed after cold-working the metal layer 24, by reaming the hole 40 to the final desired hole diameter, or by other suitable material removal techniques.

Figure 11:
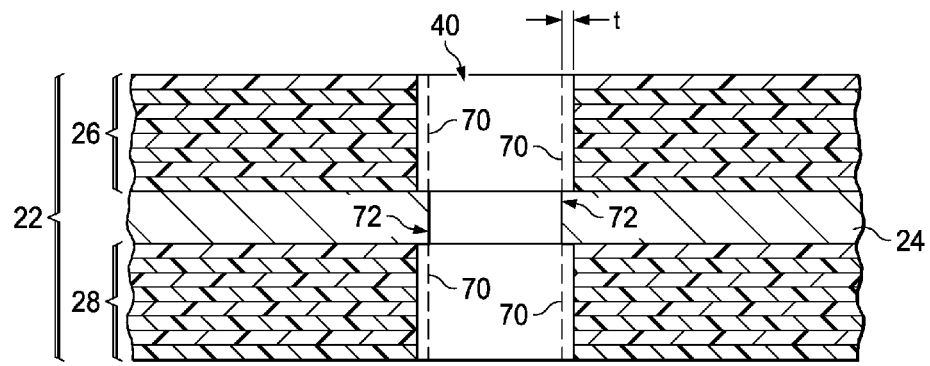
FIG. 11 is an illustration similar to FIG. 3, showing an alternate cold working method in which material is removed from the composite layers.
Figure 12:
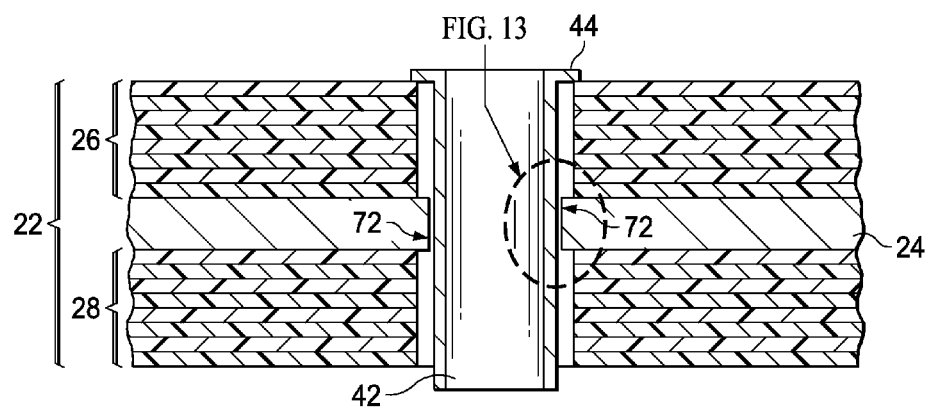
FIG. 12 is an illustration similar to FIG. 11, but showing the split sleeve having been installed in the hole, a mandrel assembly not shown for clarity.
Figure 13:
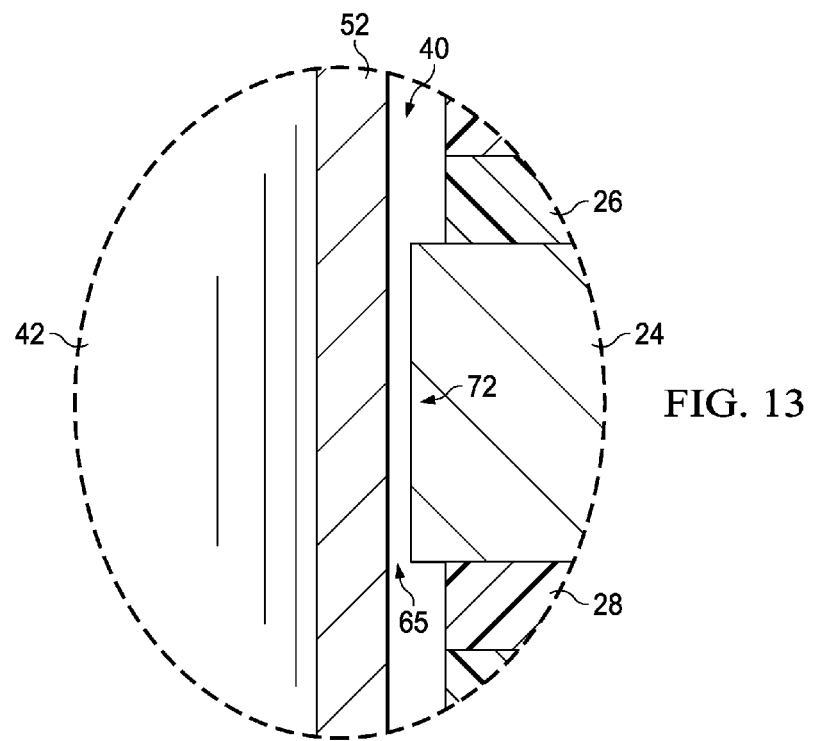
FIG. 13 is an illustration of the area designated as FIG. 13 in FIG. 12.

Attention is now directed to FIGS. 11, 12 and 13 which illustrate still another embodiment of a method of cold working only the metal layer 24, while substantially avoiding contact with the composite layers 26, 28. As shown in FIG. 11, a thickness t of material is removed from each of the composite layers 26, 28 surrounding the hole 40. The material 70 may be removed using any suitable material removal technique, such as by machining. Alternatively, before the stack 22 is assembled, a hole 40 may be formed in the metal layer 24 that is smaller in diameter than the final diameter of the finished hole 40. Using either of these techniques, the composite layers 26, 28 are recessed relative to the metal layer 24 within the hole 40. Thus, the diameter of the hole 40 within the metal layer 24 is less than the diameter of the hole 40 in either of the composite layers 26, 28. As a result of these differences in diameters, the inner edges 72 of the metal layer 24 project into the hole 40 beyond the composite layers 26, 28.

Figure 14:
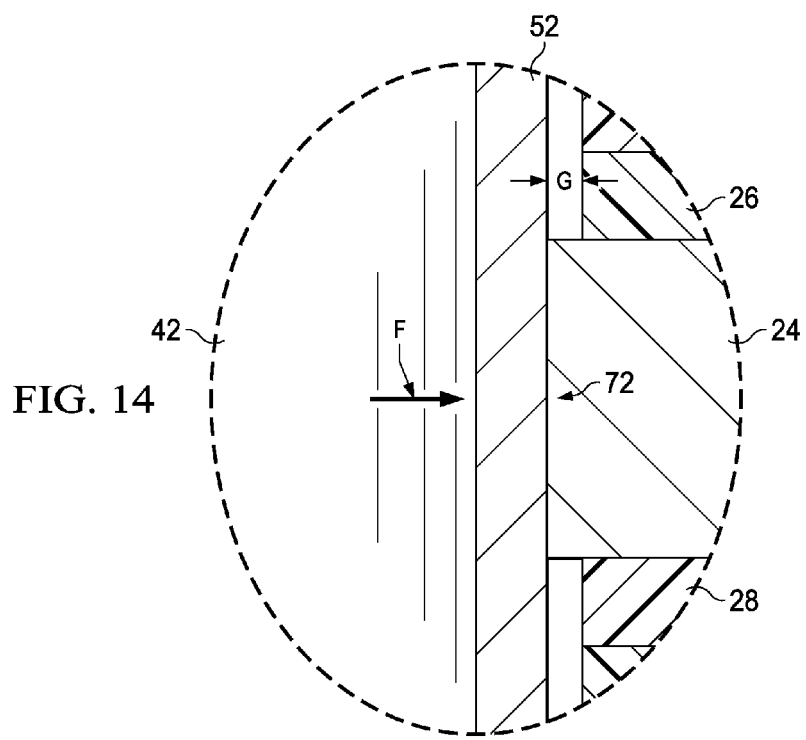
FIG. 14 is an illustration similar to FIG. 13 but showing the split sleeve having been expanded into contact with the metal layer.

FIGS. 12 and 13 show the split sleeve 42 having been installed in the hole 40, but before it has been expanded by an internal mandrel (not shown). As best seen in FIG. 13, a slight amount of clearance 65 is present between the split sleeve wall 52 and the metal layer 24 to accommodate insertion of the split sleeve 42 into the hole 40. Referring to FIG. 14, expansion of the split sleeve 42 causes the split sleeve wall 52 to engage projecting inner edges 72 of the metal layer 24 and apply a force F the metal layer 24. Because the edges of the composite layers 26, 28 are recessed relative to the projecting inner edges 72 of the metal layer, a gap G is present between the composite layers 26, 28 and the split sleeve 42 when the latter is fully expanded, consequently the split sleeve 42 cold works only the metal layer 24. The projecting inner edges 72 may be removed after cold-working the metal layer 24, by reaming the hole 40 to the final desired hole diameter, or by other suitable material removal techniques.

Figure 15:
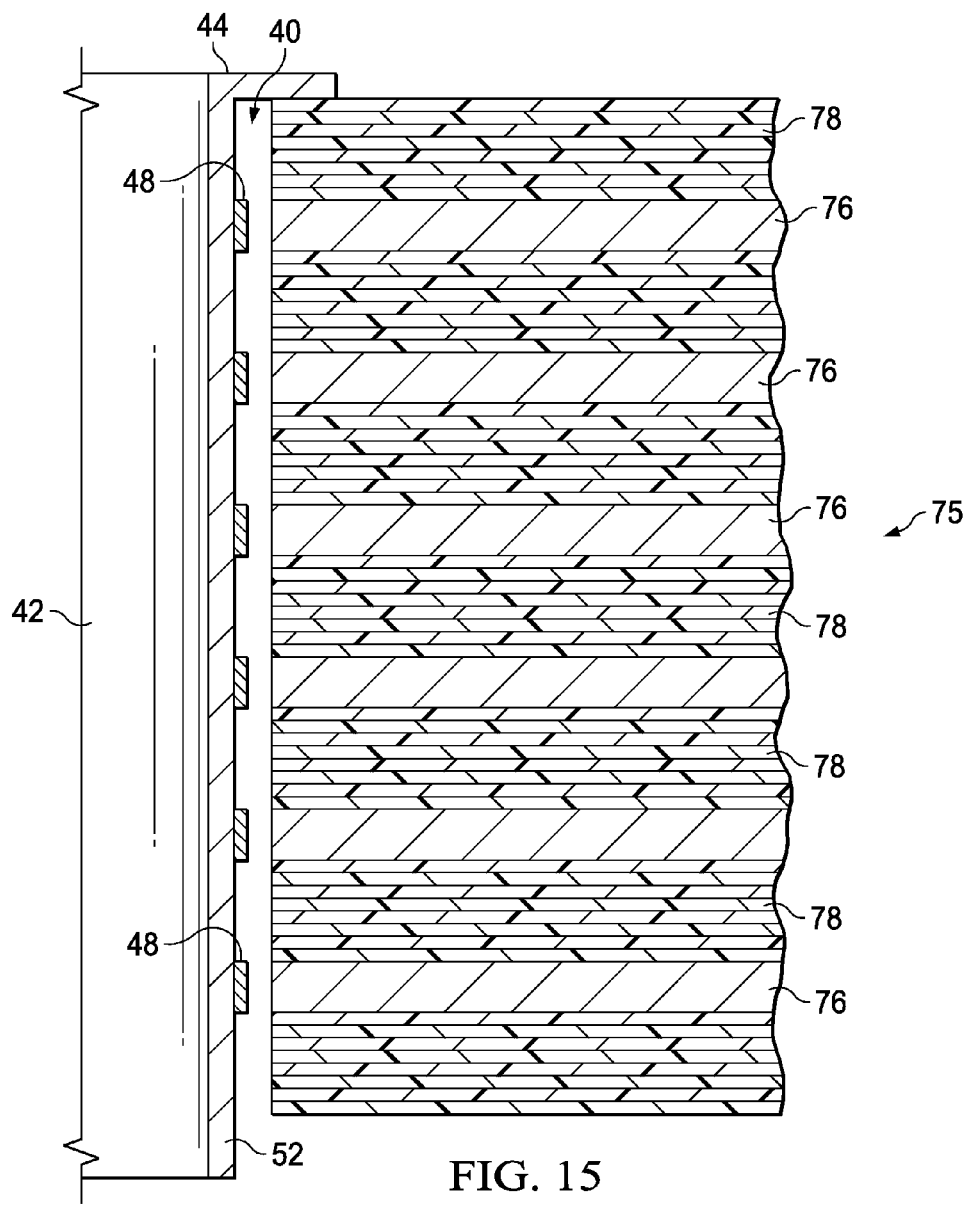
FIG. 15 is a cross sectional view of a stack comprising multiple interspersed layers of composite and metal, a split sleeve having been inserted into a hole through the stack, but not yet expanded into contact with the metal layers.

As previously mentioned, the disclosed method and device may be employed to cold work a hole in a stack comprising any number and combination of metal and composite layers. For example, referring to FIG. 15, the method may be employed to cold work a hole 40 in a stack 75 comprising a plurality of metal layers 76 interspersed between composite layers 78. In order to cold work only the metal layers 76, a plurality of spacer members 48 are interposed between the metal layers 76 and an expandable split sleeve 42. In this example, the spacer members 48 are formed on the split sleeve 42 but as previously discussed, other techniques may be used to form interferences between the split sleeve 42 and only the metal layers 76.

Figure 16:
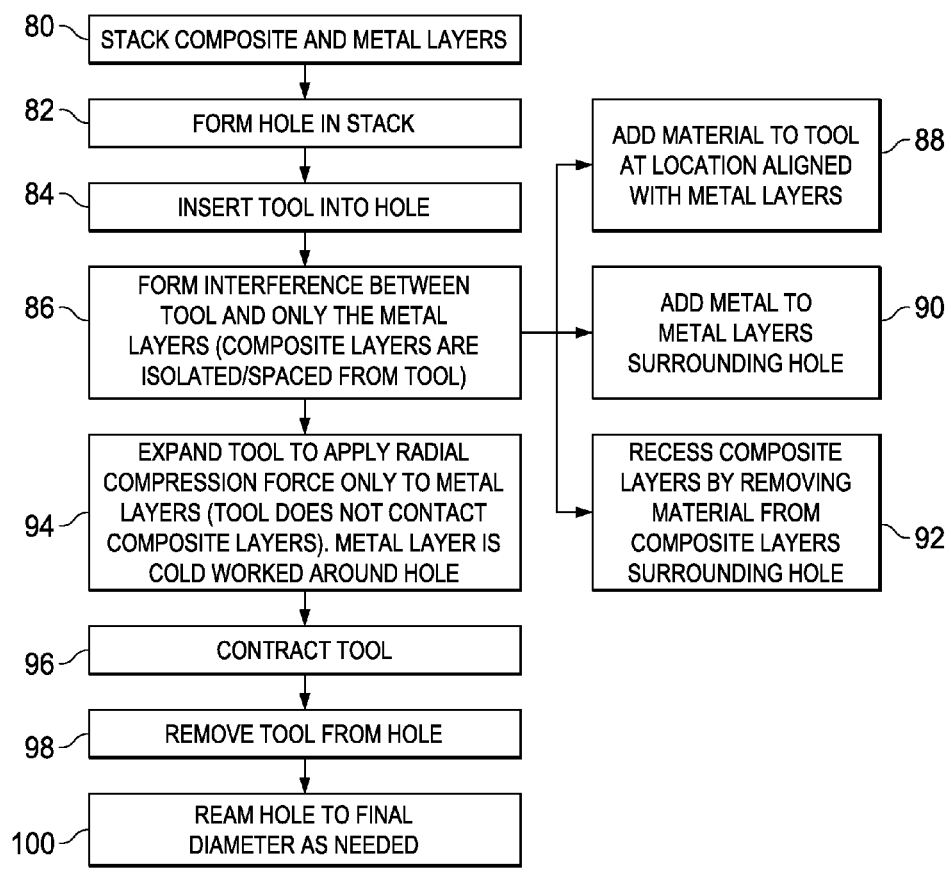
FIG. 16 is an illustration of a flow diagram of a method of cold working a hole in a composite and metal stack.

FIG. 16 illustrates the steps of a method of cold working a hole 40 in a composite and metal stack 22. Beginning at 80, composite and metal layers are arranged in a stack 22, and at 82, a hole 40 is formed in the stack 22 using any suitable technique, such as, for example and without limitation, drilling. At 84 a tool such as the split sleeve 42 previously described, is inserted into the hole 40. At step 86, an interference is formed between the tool and only the metal layers, such that the composite layers are isolated and spaced from the tool. The interference may be achieved using any of several techniques shown at steps 88, 90 and 92. At step 88, material may be added to the tool at locations that are aligned with the metal layers in the stack. Alternatively, as step 90, metal may be added to the metal layer 24 surrounding the hole 40 in order to decrease the inner diameter of the hole 40 at the metal layer 24. Adding of the metal in either of steps 88 or 90 may be performed by any of a variety of techniques, such as those previously discussed as well as other additive manufacturing processes. In another variation, at step 92, the composite layers may be recessed by removing material from areas of the composite layers, immediately, surrounding the hole 40, thereby recessing the composite layers relative to the metal layers.

At step 94, the tool is expanded to apply a radial compression force only to the metal layers. During this step, the tool does not contact or apply force to the composite layers. As a result of this radial compression force, the metal layers are cold worked around the hole 40. At step 96, the tool may be contracted, and then removed from the hole at step 98. At step 100, the holes 40 may be reamed to a final desired diameter, as needed.

Figure 17:
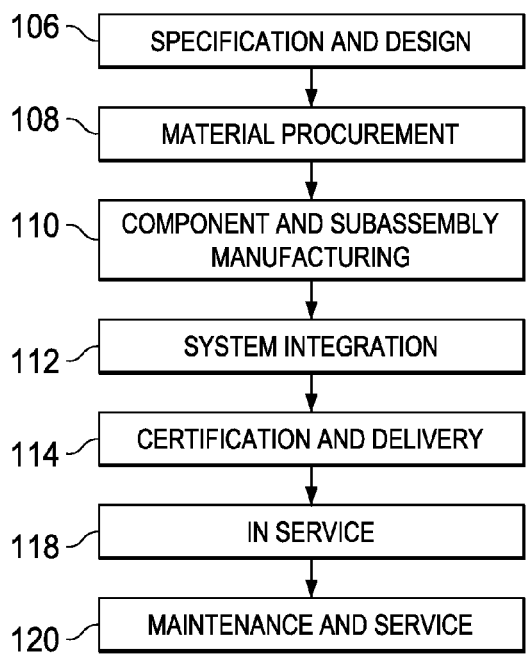
FIG. 17 is an illustration of a flow diagram of aircraft production and service methodology.
Figure 18:
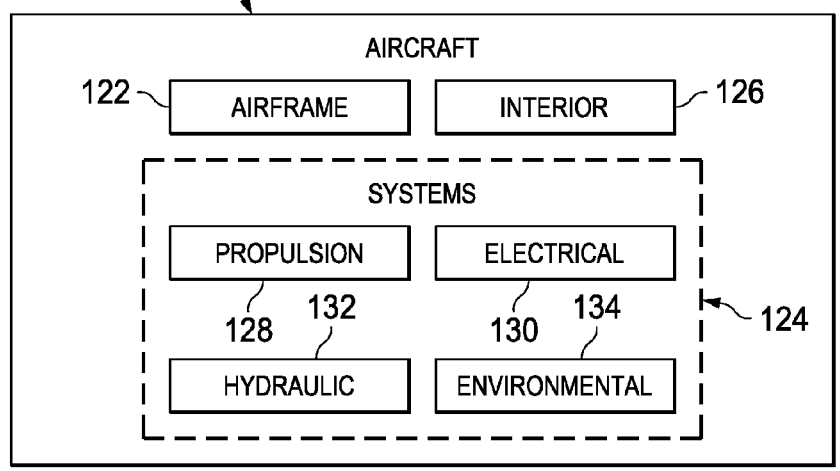
FIG. 18 is an illustration of a block diagram of an aircraft.

Embodiments of the disclosure may find use in a variety of potential applications, particularly in the transportation industry, including for example, aerospace, marine, automotive applications and other application where fastened joints between composite and metal layers may be used. Thus, referring now to FIGS. 17 and 18, embodiments of the disclosure may be used in the context of an aircraft manufacturing and service method 102 as shown in FIG. 17 and an aircraft 104 as shown in FIG. 18. Aircraft applications of the disclosed embodiments may include, for example, without limitation, cold working holes in composite and metal stacks, such as between a metal shear tie and a composite skin, or between metal splices and composite frame sections which form part of the airframe 122. During pre-production, exemplary method 102 may include specification and design 106 of the aircraft 104 and material procurement 108. During production, component and subassembly manufacturing 110 and system integration 112 of the aircraft 104 takes place. Thereafter, the aircraft 104 may go through certification and delivery 114 in order to be placed in service 118. While in service by a customer, the aircraft 104 is scheduled for routine maintenance and service 120, which may also include modification, reconfiguration, refurbishment, and so on.

Each of the processes of method 102 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 18, the aircraft 104 produced by exemplary method 102 may include an airframe 122 with a plurality of systems 124 and an interior 126. Examples of high-level systems 124 include one or more of a propulsion system 128, an electrical system 130, a hydraulic system 132 and an environmental system 134. Any number of other systems may be included. Although an aerospace example is shown, the principles of the disclosure may be applied to other industries, such as the marine and automotive industries.

Systems and methods embodied herein may be employed during any one or more of the stages of the production and service method 102. For example, components or subassemblies corresponding to production process 110 may be fabricated or manufactured in a manner similar to components or subassemblies produced while the aircraft 104 is in service 118. Also, one or more apparatus embodiments, method embodiments, or a combination thereof may be utilized during the production stages 110 and 112, for example, by substantially expediting assembly of or reducing the cost of an aircraft 104. Similarly, one or more of apparatus embodiments, method embodiments, or a combination thereof may be utilized while the aircraft 104 is in service, for example and without limitation, to maintenance and service 120.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of cold working a hole through a stack of at least one metal layer and at least one composite layer, comprising:
    placing an expandable sleeve in the hole;
    forming an interference only between the expandable sleeve and the metal layer while maintaining a gap between the expandable sleeve and the composite layer, wherein forming the interference includes interposing material between the expandable sleeve and the metal layer, and wherein interposing the material between the expandable sleeve and the metal layer includes fusing the material to the metal layer surrounding the hole; and
    using the expandable sleeve to apply an outwardly directed radial force to only the metal layer by drawing a mandrel through the expandable sleeve.

2. The method of claim 1, wherein the expandable sleeve comprises a band of increased outer diameter proximate to the at least one metal layer.

3. The method of claim 1, wherein interposing the material is performed by placing a bushing between the expandable sleeve and only the metal layer.

4. The method of claim 1, wherein interposing the material includes forming a band of material on the expandable sleeve.

5. The method of claim 4, wherein forming the band of material on the expandable sleeve is performed by one of flame spraying, electroplating, micro welding and etching.

6. The method of claim 1, wherein fusing the material to the metal layer is performed by one of electroplating and micro welding.

7. The method of claim 1, wherein the expandable sleeve comprises a band of increased outer diameter, the band adapted to contact and apply compressive force to only the at least one metal layer.

8. A method of cold working a hole through a stack of composite and metal layers, comprising:
    inserting an expandable sleeve into the hole;
    interposing material between the expandable sleeve and each of the metal layers, wherein interposing the material includes decreasing an inner diameter of the hole at each of the metal layers by fusing material to the metal layers surrounding the hole;
    expanding the expandable sleeve into contact with only the metal layers while maintaining a gap between the composite layers and the expandable sleeve; and
    applying a compression force to only the metal layers through the expandable sleeve.

9. The method of claim 8, wherein expanding the expandable sleeve is performed by drawing a mandrel through the expandable sleeve.

10. The method of claim 8, wherein maintaining the gap between the composite layers and the expandable sleeve includes interposing material between the expandable sleeve and each of the metal layers.

11. The method of claim 8, wherein fusing material is performed by one of:
    electroplating,
    micro welding,
    laser sintering, or
    additive manufacturing.

\* \* \* \* \*